US012600631B2

(12) United States Patent　(10) Patent No.: US 12,600,631 B2

Kang et al.　(45) Date of Patent: Apr. 14, 2026

(54) METHOD FOR MASS SYNTHESIS OF CARBON NANOTUBES AND CARBON NANOTUBES SYNTHESIZED THEREBY

(71) Applicant: KOREA MARITIME UNIVERSITY INDUSTRY-ACADEMIC COOPERATION FOUNDATION, Busan (KR)

(72) Inventors: Jun Kang, Busan (KR); Jae Hyuk Choi, Busan (KR); Won Ju Lee, Busan (KR); Gyu Jang Jo, Gimhae-si (KR); Se Hyeon Kim, Gimhae-si (KR); Dae Yeong Kim, Busan (KR)

(73) Assignee: KOREA MARITIME UNIVERSITY INDUSTRY-ACADEMIC COOPERATION FOUNDATION, Busan (KR)

( * ) Notice: Subject to any disclaimer, the term of this patent is extended or adjusted under 35 U.S.C. 154(b) by 1154 days.

(21) Appl. No.: 17/420,377

(22) PCT Filed: Feb. 12, 2019

(86) PCT No.: PCT/KR2019/001658

§ 371 (c)(1),
(2) Date: Aug. 16, 2022

(87) PCT Pub. No.: WO2020/141649

PCT Pub. Date: Jul. 9, 2020

(65) Prior Publication Data

US 2024/0199425 A1　Jun. 20, 2024

(30) Foreign Application Priority Data

Jan. 3, 2019　(KR) ........................ 10-2019-0000634

(51) Int. Cl.
*C01B 32/164*　(2017.01)

(52) U.S. Cl.
CPC ........ *C01B 32/164* (2017.08); *C01B 2202/02* (2013.01); *C01B 2202/06* (2013.01); *C01P 2004/03* (2013.01)

(58) Field of Classification Search
CPC .................................................. C01B 32/164
See application file for complete search history.

(56) References Cited

U.S. PATENT DOCUMENTS

| | | | | |
|---|---|---|---|---|
| 2003/0161782 | A1* | 8/2003 | Kim ........................ | B82Y 40/00 423/447.3 |
| 2006/0127299 | A1* | 6/2006 | Harbec .................. | B82Y 40/00 423/445 B |

FOREIGN PATENT DOCUMENTS

| | | |
|---|---|---|
| EP | 1334064 B1 | 9/2008 |
| KR | 20030008763 A | 1/2003 |
| KR | 20050121426 A | 12/2005 |

OTHER PUBLICATIONS

Nagahiro Saito et al "Solution plasma: A new reaction field for nanomaterials synthesis" Jpn. J. Appl. Phys. 2018, 57, 0102A4 (Year : 2018).*

(Continued)

*Primary Examiner* — Brian W Cohen
*Assistant Examiner* — Nathanael Jason Downes
(74) *Attorney, Agent, or Firm* — McCoy Russell LLP

(57)　ABSTRACT

The present invention relates to a method for mass synthesis of carbon nanotubes and carbon nanotubes synthesized thereby and, more specifically, to a method for mass synthesis of carbon nanotubes and carbon nanotubes synthesized thereby, wherein the method enables not only the synthesis of a catalyst at a high rate through plasma generation without a separate reductant but also the continuous mass synthesis of high-purity carbon nanotubes. The technical essences of the present invention are a method for mass synthesis of carbon nanotubes and carbon nanotubes syn- (Continued)

Graphite Sheet

Single-Walled Carbon Nanotube　Double-Walled Carbon Nanotube　Multi-Walled Carbon Nanotube thesized thereby, the method comprising: a first step of supplying a CNT growth material containing a carbon precursor; a second step of disposing a pair of metal wires in a solution mixed with a metal salt, and applying electric power to the metal wires to generate plasma; and a third step of thermally treating the CNT growth material and the catalyst.

6 Claims, 8 Drawing Sheets

(56) References Cited

OTHER PUBLICATIONS

Zhypargul Abdullaeva, et al Onion-like carbon-encapsulated Co, Ni, and Fe magnetic nanoparticles with low cytotoxicity synthesized by a pulsed plasma in a liquid, Carbon, vol. 50, Issue 5, pp. 1776-1785, (Year: 2012).*

Lee, B. et al., "Ferritin-mixed solution plasma system yielding low-dimensional carbon nanomaterials and their application to flexible conductive paper," Current Applied Physics, vol. 15, No. 11, Sep. 1, 2015, 6 pages.

European Patent Office, Extended European Search Report Issued in Application No. 19907165.5, Aug. 29, 2022, Germany, 9 pages.

Wei, Y. et al., "Liquid-phase plasma synthesis of silicon quantum dots embedded in carbon matrix for lithium battery anodes," Materials Research Bulletin, vol. 48, No. 10, Oct. 2013, 6 pages.

Horikoshi, S. et al., "In-liquid plasma: a novel tool in the fabrication of nanomaterials and in the treatment of wastewaters," RSC Advances, vol. 7, No. 75, Oct. 6, 2017, 23 pages.

Mun, M. et al., "Nanoparticles Synthesis and Modification using Solution Plasma Process," Applied Science and Convergence Technology, vol. 26, No. 6, Nov. 30, 2017, 10 pages.

ISA Korean Intellectual Property Office, International Search Report Issued in Application No. PCT/KR2019/001658, Oct. 1, 2019, WIPO, 2 pages.

* cited by examiner

Graphite Sheet

| Single-Walled<br>Carbon Nanotube | Double-Walled<br>Carbon Nanotube | Multi-Walled<br>Carbon Nanotube |

METHOD FOR MASS SYNTHESIS OF CARBON NANOTUBES AND CARBON NANOTUBES SYNTHESIZED THEREBY

CROSS REFERENCE TO RELATED APPLICATIONS

The present application is a U.S. National Phase of International Application No. PCT/KR2019/001658 entitled "METHOD FOR MASS SYNTHESIS OF CARBON NANOTUBES AND CARBON NANOTUBES SYNTHE-SIZED THEREBY," and filed on Feb. 12, 2019. International Application No. PCT/KR2019/001658 claims priority to Korean Patent Application No. 10-2019-0000634 filed on Jan. 3, 2019. The entire contents of each of the above-listed applications are hereby incorporated by reference for all purposes.

TECHNICAL FIELD

The present invention relates to a method for mass synthesis of carbon nanotubes and carbon nanotubes synthesized thereby, and more particularly, to a method for mass synthesis of carbon nanotubes and carbon nanotubes synthesized thereby, wherein the method enables not only the synthesis of a catalyst at a high rate through plasma generation without using a separate reductant but also the continuous mass synthesis of high-purity carbon nanotubes.

BACKGROUND AND SUMMARY

Carbon nanotubes first found by Sumio Iijima in 1991 refer to structures in which one carbon atom is bonded to three neighboring carbon atoms to form a honeycomb-shaped hexagonal shape. In this case, such hexagonal structures are repeatedly arranged to lay up into a cylindrical shape or form a tubular shape.

So far, there have been attempts to conduct many types of theoretical research and development of the carbon nanotubes as industrial applications since the finding of the carbon nanotubes. In particular, the carbon nanotubes are known as a new material that hardly has defects among the existing materials because the carbon nanotubes have excellent mechanical properties, electrical selectivity, superior field emission properties, high-efficiency hydrogen storage medium characteristics, and the like.

Such carbon nanotubes are divided into single-walled carbon nanotubes (SWCNTs), double-walled carbon nanotubes (DWCNTs), and multi-walled carbon nanotubes (MWCNTs) according to the shape of the carbon nanotubes.

FIG. 1 is a schematic diagram of a carbon nanotube. FIG. 1 schematically shows various structures of the carbon nanotube according to the shape of the carbon nanotube. Here, it can be seen that FIG. 1A shows a single-walled carbon nanotube (SWCNT) consisting of one tube, FIG. 1B shows a double-walled carbon nanotube (DWCNT) consisting of two tubes, and FIG. 1C shows a multi-walled carbon nanotube (MWCNT) formed while a number of tubes form a concentric circle.

In recent years, research on technology capable of synthesizing a large amount of high-purity carbon nanotubes at a time has been actively conducted. In this case, this method includes an arc discharge method, a laser deposition method, a CVD method, a fluidized-bed reactor, a HiPco method, and the like.

FIG. 2 is a conceptual diagram of the arc discharge method. Referring to FIG. 2, it can be seen that a conventional arc discharge method is schematically shown. That is, the arc discharge method is a method in which arc discharge occurs at a current of 50 to 100 A between graphite rods disposed respectively in a positive electrode and a negative electrode in a vacuum chamber. In this case, the positive electrode reaches a high temperature of approximately 4,000 K, and steam generated in the positive electrode is solidified in the negative electrode.

This arc discharge method is characterized in that carbon nanotubes having high linearity may be obtained, and thus has been evaluated to have a high degree of crystallization but have low yield or purity (about 30%) and somewhat have problems concerning mass production.

FIG. 3 is a conceptual diagram of a laser deposition method. Referring to FIG. 3, it can be seen that a conventional laser deposition method is schematically shown. That is to say, the laser deposition method is similar to the arc discharge method, but is different from the arc discharge method in that the laser deposition method uses a laser instead of the discharging. That is, the laser deposition method is performed by installing a graphite rod, which is obtained by blending a metal acting as a catalyst is installed inside an electric furnace heated to 1,000 to 2,000° C., and evaporating and solidifying carbon through laser irradiation. Therefore, the laser deposition method is characterized in that it is easy to control the temperature, it has a high degree of crystallization, and it is possible to control the diameter.

However, the laser deposition method has drawbacks in that the purity (approximately 70%) of the carbon nanotubes is not so high and the yield of the carbon nanotubes is low. Therefore, the laser deposition method is mainly used to study physical properties of materials in laboratories, and the like because the maintenance and repair are difficult due to the use of laser and a trace of the carbon nanotubes is produced.

FIG. 4 is a conceptual diagram of a CVD method. Referring to FIG. 4, it can be seen that a conventional chemical vapor deposition (CVD) method is schematically shown. That is, the CVD method is a method for synthesis of carbon nanotubes on a substrate using a chemical change by heat of a carbon-containing gas, and the like.

Such a CVD method enables mass production of carbon nanotubes and may be used to obtain high-purity carbon nanotubes, but has a problem in that, when a flow rate of the carbon-containing gas changes in a quartz tube, the degree of uniformity on the substrate may be deteriorated due to the lack of uniformity in gas supply. On the other hand, the CVD method is relatively favorable for mass synthesis, but has drawbacks in that it is difficult to mass-produce the carbon nanotubes required in a practical aspect.

FIG. 5 is a conceptual diagram of a fluidized-bed reactor. Referring to FIG. 5, it can be seen that a conventional fluidized-bed reactor method is schematically shown. In particular, the fluidized-bed reactor currently widely used in the method for mass synthesis of carbon nanotubes has an advantage in that it may continuously synthesize a large amount of carbon nanotubes at a time.

However, it is important to allow a fluidized bed of catalyst in a reaction zone to flow well in the fluidized-bed reactor without coagulation of the catalyst. In this case, the fluidized-bed reactor has a drawback in that the shape or size of a carrier for supporting a catalyst should be maintained uniformly to uniformly fluidize the carrier, and also has a drawback in that it has a structure unfavorable to the reduction of unit cost because this synthesis method is in a batch type.

In particular, the fluidized-bed reactor has a drawback in that it has a process time because it involves synthesizing a catalyst by a reaction of a precursor, a reductant, and a protecting agent, synthesizing a carrier by a calcination process using a carrier precursor and a carrier reductant, supporting the catalyst on the carrier, and removing the carrier.

FIG. 6 is a conceptual diagram of a HiPco method. Referring to FIG. 6, it can be seen that a high-pressure CO (HiPco) method for synthesis of carbon nanotubes by spraying $Fe(CO)_5$ as a catalyst precursor CO as a carbon source onto a mixed zone through a nozzle under the conditions of a pressure of 20 atm or more and a high temperature of 1,000° C. is shown as the method for mass synthesis of carbon nanotubes.

The HiPco method has a disadvantage in that it is difficult to set the conditions of temperature and pressure at which a nucleation step of generating catalyst particles with a proper size and a growth step of thermally decomposing a reactive gas on a catalyst metal to grow carbon nanotubes are performed at the same time.

In addition, the method for mass synthesis of carbon nanotubes includes an alcohol catalytic CVD (ACCVD) method using a Fe/Co catalyst supported on zeolite, an enhanced direct injection pyrolytic synthesis (eDIPS) method using an organic metal compound (such as Ferrocene) as the catalyst, and the like.

However, the ACCVD method or the eDIPS method as described above has drawbacks in that a process is not simple, and it is impossible to enable the continuous mass synthesis of high-purity carbon nanotubes.

Therefore, in terms of a new perspective going beyond the described-above methods for synthesis of carbon nanotubes, there is an urgent need for development and research of technology that enables the continuous mass synthesis of carbon nanotubes.

Disclosure

Technical Problem

The present invention is designed to solve the problems of the prior art, and therefore an object of the present invention is to provide a method for mass synthesis of carbon nanotubes and carbon nanotubes synthesized thereby, wherein the method enables not only the synthesis of a catalyst at a high rate through plasma generation without using a separate reductant but also the continuous mass synthesis of high-purity carbon nanotubes.

Technical Solution

In one general aspect, a method for mass synthesis of carbon nanotubes includes: a first step of supplying a CNT growth material including a carbon precursor; a second step of disposing a pair of metal wires in a solution in which a metal salt is mixed, and applying electric power to the metal wires to generate plasma, thereby synthesizing a catalyst while reducing the metal salt into a metal atom; and a third step of thermally treating the CNT growth material and the catalyst to dissolve the carbon precursor in the catalyst, thereby continuously synthesizing carbon nanotubes while growing the carbon nanotubes.

Preferably, the CNT growth material in the first step may include any one or more selected from the group consisting of a liquid-phase CNT growth material including ethanol ($C_2H_6O$), benzene ($C_6H_6$), and toluene ($C_7H_8$); a gas-phase CNT growth material including any one or more hydrocarbon compounds selected from methane ($CH_4$), propylene ($C_3H_6$), propyne ($C_3H_4$), propane ($C_3H_8$), butane ($C_4H_{10}$), butylene ($C_4H_8$), butadiene ($C_4H_6$), and ethylene ($C_2H_2$); and a solid-phase CNT growth material including Camphor ($C_{10}H_{16}O$).

Preferably, the electric power in the second step may be bipolar pulsed direct electric power by which an electrical signal is repeatedly applied with one or more pauses.

Preferably, the protecting agent may be mixed in the solution to cap the metal atom with the protecting agent.

Preferably, the catalyst in the second step may include any one or more selected from the group consisting of a metal catalyst including any one selected from cobalt (Co), nickel (Ni), and iron (Fe); an alloy catalyst including an alloy of two or more selected from cobalt (Co), nickel (Ni), and iron (Fe); and a metal oxide catalyst including cobalt oxide, nickel oxide, iron oxide, and a composite oxide of two or more thereof.

Preferably, the metal wire and the metal salt may be composed of different metals to form the alloy catalyst through plasma generation.

Preferably, the thermal treatment in the third step may be performed under the condition of a temperature of 500 to 1,200° C.

In another general aspect, carbon nanotubes are continuously synthesized by the described-above method for mass synthesis of carbon nanotubes.

Advantageous Effects

According to the technical solution, a method for mass synthesis of carbon nanotubes according to the present invention and carbon nanotubes synthesized thereby have the following effects:

First, because a metal salt itself included in a solution is reduced during synthesis of a catalyst, the method for mass synthesis of carbon nanotubes according to the present invention does not require a separate reductant, and thus can be effective in not only reducing the manufacturing cost of the catalyst but also improving the purity of the catalyst.

Second, the method for mass synthesis of carbon nanotubes according to the present invention can be effective in synthesizing a catalyst consisting of various compositions through a combination of a metal salt and a metal wire.

Third, because the catalyst is synthesized at a high rate through plasma generation, the method for mass synthesis of carbon nanotubes according to the present invention can be effective in enabling the synthesis of the catalyst, and simultaneously enabling the real-time continuous synthesis of carbon nanotubes by spraying a carbon source onto a CNT synthesis unit.

DETAILED DESCRIPTION

Best Mode

Hereinafter, preferred embodiments of the present invention will be described in detail with reference to the accompanying drawings.

Figure 1:
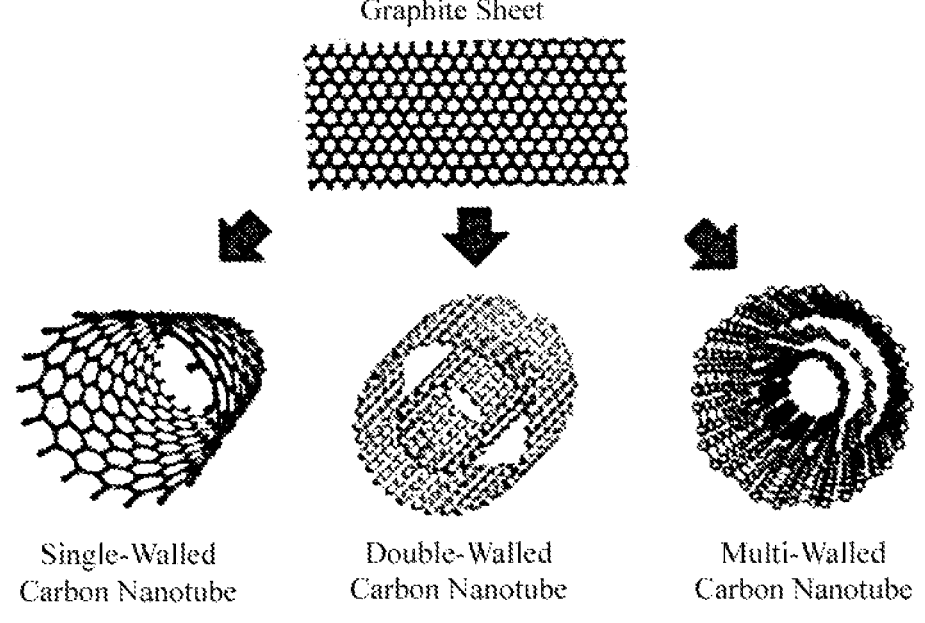
FIG. 1 is a schematic diagram of a carbon nanotube.
Figure 2:
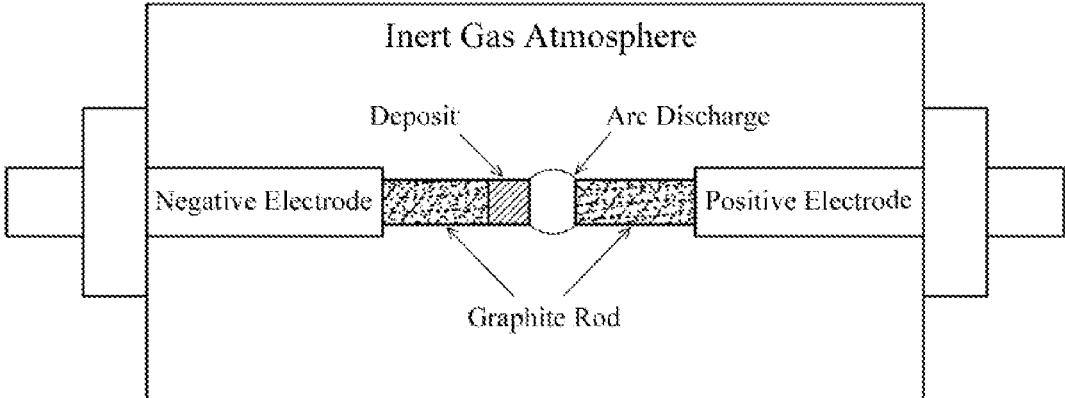
FIG. 2 is a conceptual diagram of an arc discharge method.
Figure 3:
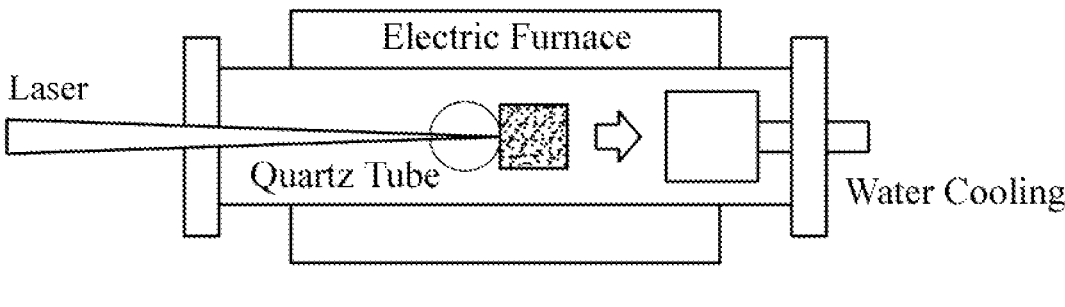
FIG. 3 is a conceptual diagram of a laser deposition method.
Figure 4:
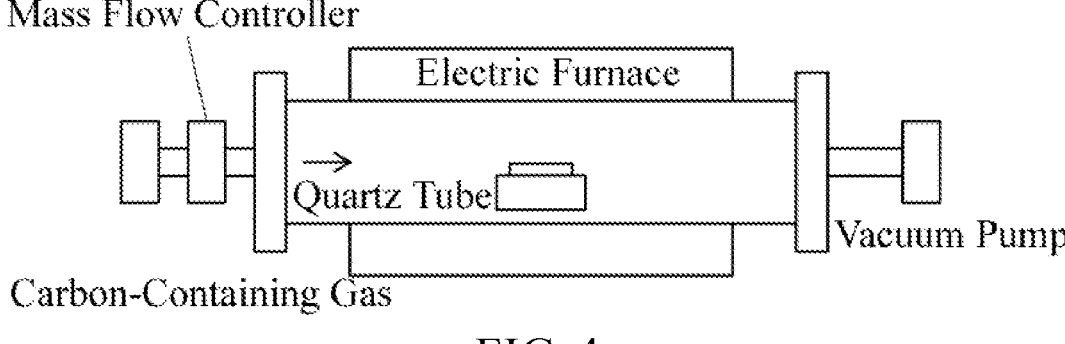
FIG. 4 is a conceptual diagram of a CVD method.
Figure 5:
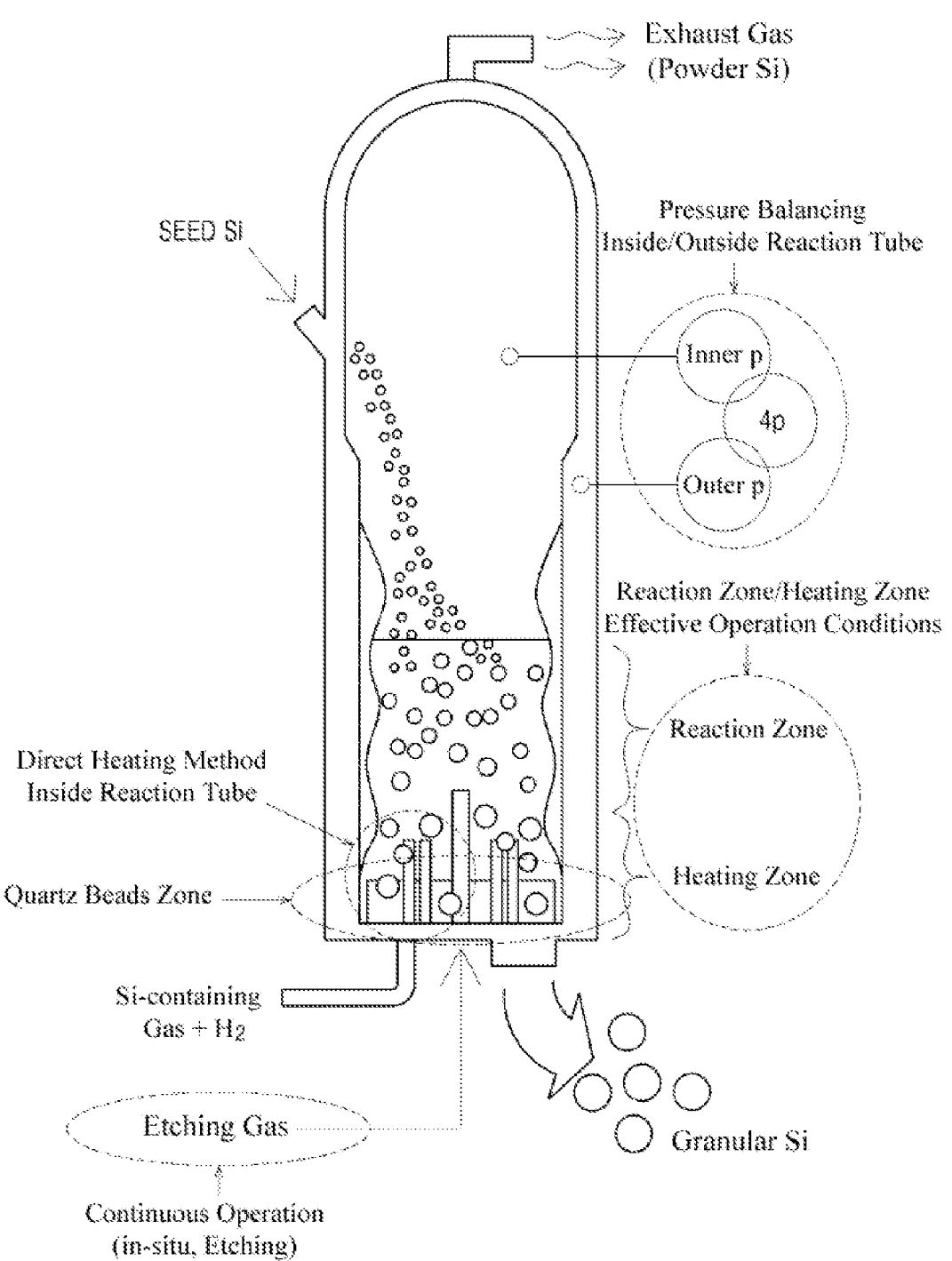
FIG. 5 is a conceptual diagram of a fluidized-bed reactor.
Figure 6:
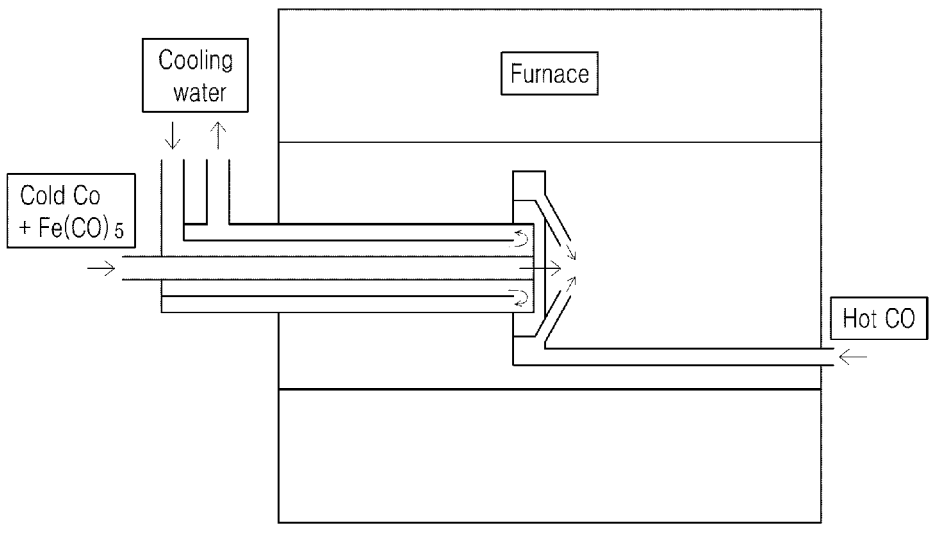
FIG. 6 is a conceptual diagram of a HiPco method.
Figure 7:
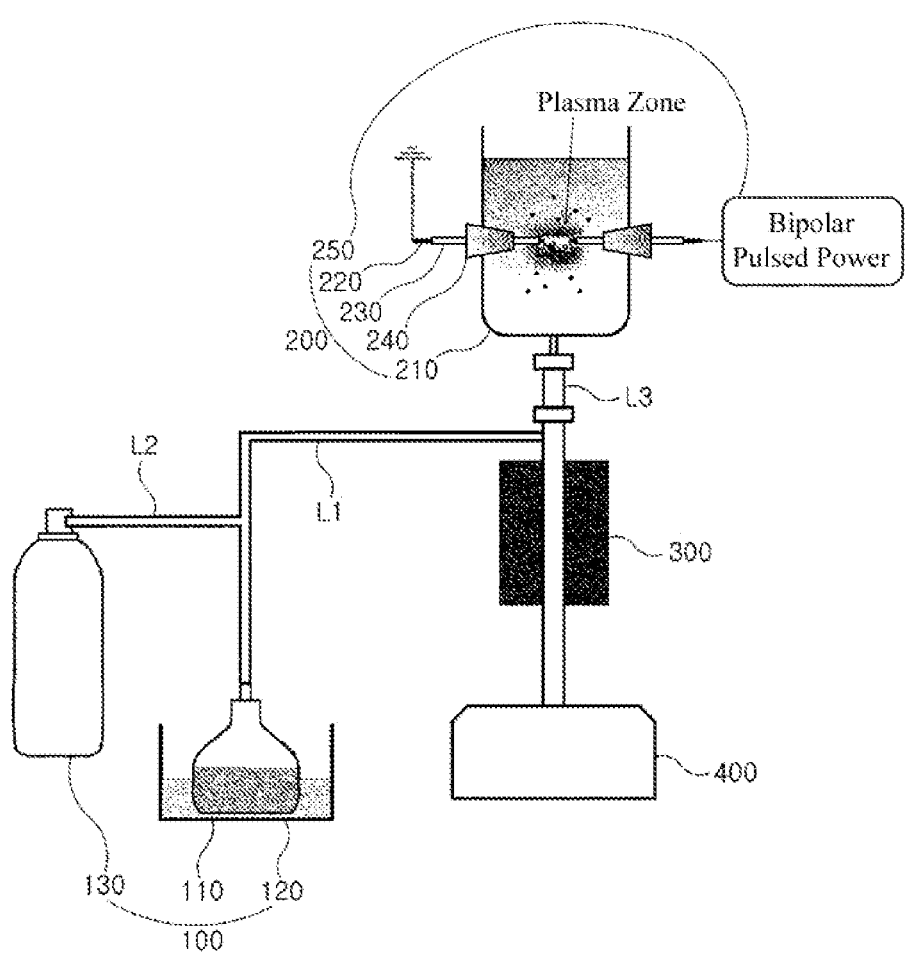
FIG. 7 is a schematic diagram of an apparatus according to a preferred embodiment of the present invention.

FIG. 7 is a schematic diagram of an apparatus according to a preferred embodiment of the present invention. Referring to FIG. 7, it can be seen that an apparatus for mass synthesis of CNTs is shown, which includes a carbon source supply unit 100, a plasma discharge unit 200, a CNT synthesis unit 300, and a collector unit 400 to continuously mass-synthesize carbon nanotubes.

First, the carbon source supply unit 100 includes a tank 110 accommodating a CNT growth material, a hot bath 120 which has a certain space so that the tank 110 can be safely installed and received therein and into which water is introduced into the space, and a gas supply unit 130 configured to supply a carrier gas into a first flow path L1 so that the CNT growth material accommodated in the tank 110 can move to a furnace (i.e., a CNT synthesis unit 300), the gas supply unit 130 being connected to the tank 110 by a second flow path L2.

Second, the plasma discharge unit 200 is installed at a relatively higher position than the carbon source supply unit 100. In this case, the plasma discharge unit 200 includes a chamber 210 accommodating a solution for plasma discharging, a pair of metal wires 220 positioned in the solution in a longitudinal direction, a ceramic tube 230 surrounding the peripheries of the metal wires 220, a silicone plug 240 surrounding the periphery of the ceramic tube 230 so that it can be inserted and fixed into a chamber 210 in a press-fitted manner, and electric power 250 configured to apply electricity to the pair of metal wires 220.

Third, the CNT synthesis unit 300 allows a CNT growth material charged from the carbon source supply unit 100 through the first flow path L1 to react with a catalyst sprayed in the form of particles through the spray nozzle L3 installed below the plasma discharge unit 200 to dissolve the CNT growth material in the catalyst, thereby producing carbon nanotubes in a continuous mass synthesis manner while growing the carbon nanotubes.

Fourth, the collector unit 400 collects the carbon nanotubes from the CNT synthesis unit 300 in a state in which the carbon nanotubes are attached to the catalyst when the synthesis is completed, and treats the collected carbon nanotubes with an acid to separate the carbon nanotubes only. Accordingly, this procedure is finished.

In summary, the method for mass synthesis of carbon nanotubes may be performed through the first step (S10), the second step (S20), and the third step (S30) using the apparatus for mass synthesis of CNTs shown in FIG. 7, and each of the steps will be described in further detail, as follows.

First, the first step is a step of supplying a CNT growth material including a carbon precursor (S10).

That is, the first step is step of supplying a material capable of growing carbon nanotubes. In this case, any one or more selected from a liquid-phase CNT growth material in a liquid type, a gas-phase CNT growth material in a gas type, and a solid-phase CNT growth material in a solid type may be selected and used as the CNT growth material.

In the case of the liquid-phase CNT growth material, any one or more selected from ethanol ($C_2H_6O$), benzene ($C_6H_6$), and toluene ($C_7H_8$) may be selected. However, when the liquid-phase CNT growth material is in a liquid type, the use of ethanol ($C_2H_6O$) including oxygen is most preferred.

In the case of the gas-phase CNT growth material, any one or more hydrocarbon compounds selected from methane ($CH_4$), propylene ($C_3H_6$), propyne ($C_3H_4$), propane ($C_3H_8$), butane ($C_4H_{10}$), butylene ($C_4H_8$), butadiene ($C_4H_6$), and ethylene ($C_2H_2$) may be selected.

In the case of the solid-phase CNT growth material, Camphor ($C_{10}H_{16}O$) which is one of monoterpene ketones may be selected. In this case, when the solid-phase CNT growth material is in a solid type, the solid-phase CNT growth material may be installed inside the CNT synthesis unit 300.

However, CNT growth materials are not limited to the types of CNT growth materials as described above, and may be widely used as long as they are materials that enable the growth of carbon nanotubes.

For reference, the gas supply unit 130 accommodating the carrier gas may be installed so that the gas supply unit 130 is connected to the second flow path L2 connected to the first flow path L1 through which the CNT growth material may move to the CNT synthesis unit 300.

Such a carrier gas is intended to emit unwanted elements (such as hydrogen, oxygen, and the like) separated from the carbon precursor included in the CNT growth material, and may include one or more selected from the group consisting of argon (Ar), nitrogen ($N_2$), hydrogen ($H_2$), and a mixed gas thereof.

Next, the second step is a step of disposing a pair of metal wires 220 in a solution with which a metal salt is mixed, and applying electric power 250 to the metal wires 220 to generate plasma, thereby synthesizing a catalyst while reducing the metal salt into a metal atom (S20).

First, a conventional nanoink for a catalyst is synthesized in a solution using a chemical reduction method. For this purpose, a metal precursor, a reductant, and a protecting agent which prevents a catalyst from growing from a nano-size to a microsize are required.

That is, the prior-art methods involve reducing a metal precursor on a ceramic carrier (such as alumina) having a size of several tens or hundreds of micrometers to synthesize a catalyst, and floating the carrier by blowing a gas into a fluidized-bed reactor in order to grow carbon nanotubes. Therefore, a process of removing the carrier should be further required later.

However, the second step of the present invention is performed in a method for plasma generation in a solution to synthesize a catalyst. In this case, because the metal salt is reduced, the catalyst may be prepared without needing a reductant, thereby reducing the unit cost caused by addition of an expensive reductant. Also, because the carrier does not need to be removed, the introduced processes may also be minimized, thereby remarkably enhancing the purity of the catalyst as well.

That is, the second step is a step of synthesizing a nanoink for a catalyst through plasma discharge in the solution and preparing the nanoink for a catalyst to spray the nanoink for a catalyst into the CNT synthesis unit 300 of the third step through the spray nozzle L3 in the form of particles.

In this case, the solution introduced into the chamber 210 for plasma discharging may be water or ethanol. In this case, the reasons for using water or ethanol as the solution are as follows.

A first reason is to enhance the solubility of a metal salt contained in the solution.

A second reason is to allow oxygen included in water or ethanol to oxidize amorphous carbon having a weak binding affinity to burn away during a process for mass synthesis of carbon nanotubes in order to enhance the purity of carbon nanotubes.

A third reason is to easily spray the nanoink for a catalyst whose synthesis is completed in the chamber 210 into the CNT synthesis unit 300 in the form of particles even using an apparatus such as a commercially available ultrasonic humidifier, and the like.

Here, a gas phase zone surrounds the periphery of a plasma zone, and radicals flowing out from the plasma zone move to the gas phase zone. Thereafter, a chemical reaction occurs as a reaction with chemical species in the solution. In this case, as the temperature in the solution decreases, the gas phase zone surrounding plasma becomes smaller, and the reaction zone becomes smaller. Therefore, a decrease in reaction speed results in a smaller size of catalyst particles. Therefore, the temperature of the solution is applicable from approximately −20° C.

However, when the temperature in the solution increases, the gas phase zone becomes larger. As a result, as a contact area between a liquid phase zone and a gas phase zone increases, an increase in reaction speed results in a larger size of the catalyst. Therefore, the gas phase zone may become smaller with a decreasing temperature, and the size of the catalyst may also be reduced.

In particular, the 20 to 40 mM metal salt and 3 to 4 g of the protecting agent are desirably reacted in 100 to 200 mL of the solution. In this case, the metal salt and the protecting agent may be reacted in the solution under various range conditions in a direct or inverse proportion according to the ratio.

For example, when an amount of the solution is less than 100 mL, the metal salt included in the solution is not sufficiently dissolved, which makes it difficult to aid in reducing the metal salt. On the other hand, when the amount of the solution is greater than 200 mL, a larger amount of the solution remains without any reaction with the metal salt. Also, the metal salt should be added as many as a too large amount of the solution. In this case, the reaction rate may be rather degraded. Therefore, the solution is preferably added in a range of 100 to 200 mL.

Also, when a concentration of the metal salt is less than 20 mM, the concentration of the metal salt is short of an amount to be reacted with the solution, which makes it difficult to continuously synthesize the catalyst. On the other hand, when the concentration of the metal salt is greater than 40 mM, a too large amount of the metal salt moves around in an ionic state in the solution. In this case, because the metal salt is likely to be present in a non-reduced state, it is also undesirable to synthesize the catalyst. Therefore, the metal salt is preferably added in a range of 20 to 40 mM.

Then, when the protecting agent is added at an amount of less than 3 g, this amount of the protecting agent may be an insufficient amount to prevent the growth of nanoparticles into a microsize. On the other hand, when the amount of the protecting agent is greater than 4 g, the protecting agent may be very highly influenced by an effect of the solution conditions. In this case, because the protecting agent may not properly play its intrinsic role, the protecting agent is preferably added in a range of 3 to 4 g.

In addition, 0.8 to 1.2 g (more preferably 1 g) of the protecting agent is preferably used per 10 mM of the metal salt. Based on the experimental results, it was confirmed that the yield of the carbon nanotubes was highest when 1 g of the protecting agent was used, compared to when 0.5 g of the protecting agent is used and when 2 g of the protecting agent was used. The results are listed in Table 1 below.

TABLE 1

|   | Metal salt (mm) | Protecting agent (g) | Yield |
|---|---|---|---|
| 1 | 10 | 0.5 | Low |
| 2 | 10 | 1 | High |
| 3 | 10 | 2 | Low |

The protecting agent serves to cap nanoparticles, which are metal atoms that are reduced in a plasma zone to grow into particles when introduced into the solution, in order to prevent the nanoparticles from growing to a microsize. For example, any one or more selected from polyvinyl pyrrolidone (PVP), sodium dodecyl sulfate (SDS), sodium dodecyl benzene sulfonate (SDBS), cetrimonium bromide (CTAB), and gelatin may be optionally used as the protecting agent. In addition, any type of protecting agent may be used as long as they are applied as the protecting agent. Based on the experimental results, it can be seen that the carbon nanotubes are synthesized at a higher yield when sodium dodecyl sulfate (SDS) is used.

Figure 8:
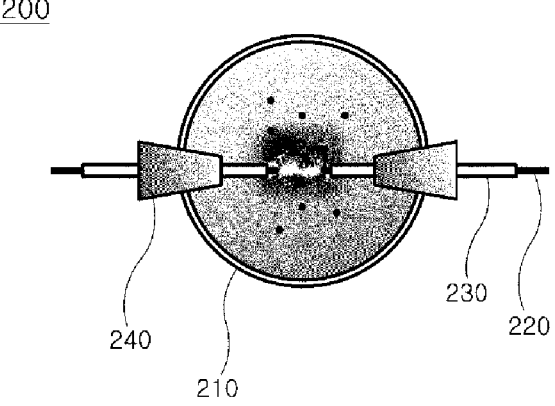
FIG. 8 is a top view of a plasma discharge unit according to a preferred embodiment of the present invention.

FIG. 8 is a top view of a plasma discharge unit 200 according to a preferred embodiment of the present invention. Referring to FIG. 8, it can be seen that an image viewed from the top of the plasma discharge unit 200 shown in FIG. 7 is shown.

That is, when bipolar pulsed direct electric power is applied to the pair of metal wires 220 immersed in the solution, plasma discharge occurs as shown in FIG. 8. As a result, hydrogen radicals and electrons generated in the plasma zone reduce the metal salt dissolved in the solution into metal atoms, and several hundreds, thousands, or tens of thousands of the metal atoms reduced in this way are gathered to grow into nanosized nanoparticles.

Here, the pair of metal wires 220 is desirably disposed at a distance of less than 1 mm. In this case, when the distance between the pair of metal wires 220 is greater than 1 mm, it is difficult to cause plasma discharge due to the too far distance between the metal wires 220. Therefore, it is desirable to properly adjust the distance between the pair of metal wires 220.

Then, in the case of the catalyst, a metal catalyst made of a single metal such as cobalt (Co), nickel (Ni), iron (Fe), and the like, an alloy catalyst made of an alloy of the single metals, and a metal oxide thereof may be used as the catalyst.

When necessary, molybdenum carbide may be used to synthesize carbon nanotubes having conductive properties, or tungsten carbide may also be used to optionally synthesize carbon nanotubes having semiconducting properties. In this case, the methods for synthesis of a catalyst may be classified, as follows.

A first method is to synthesize a metal catalyst consisting of a single metal such as cobalt (Co), nickel (Ni), and iron (Fe).

As one example, as previously described above, the metal salt dissolved in the solution is reduced with hydrogen radicals and electrons generated in the plasma zone to form metal atoms, and several hundreds, thousands, or tens of thousands of the atoms reduced in this way may be gathered to grow into nanosized nanoparticles, thereby synthesizing a metal catalyst. In this case, tungsten (W) having the highest melting point of 3,300° C. or more is preferably used for the metal wires 220 required for plasma generation. In this case, because the catalyst has a somewhat wide side distribution, but the metal salt is reduced in a moment, it has an advantage in that a concentration of the nanoink for a catalyst is high.

As another example, the metal catalyst may be synthesized from the metal wires 220 required to generate plasma. In this case, the metal wires 220 may be converted into nanosized particles in a top-down manner using a sputtering phenomenon caused by plasma generation to synthesize a metal catalyst. In this case, because a concentration of the nanoink for a catalyst is somewhat low, an amount of the carbon nanotubes may be reduced. However, the metal catalyst has an advantage in that the size of the catalyst may be reduced to 5 nm or less due to the narrow size distribution of the catalyst.

A second method is to synthesize an alloy catalyst consisting of an alloy.

This means that a catalyst having various compositions may be synthesized. In this case, the metal salt mixed in the solution and the metal wires may be composed of different metals so that the ratio of the metal salt and the metal wires can be adjusted through various combinations.

As one example, metal salts of heterogeneous elements (e.g., iron (Fe) and nickel (Ni); and iron (Fe) and cobalt (Co)) may be dissolved in the solution, and then reduced with hydrogen radicals and electrons generated in plasma to synthesize an alloy catalyst.

As another example, each of the pair of metal wires 220 required for plasma generation may be composed of different metals such as iron (Fe), cobalt (Co), nickel (Ni), and the like to synthesize an alloy catalyst in the plasma zone (see FIG. 7).

As still another example, components of the pair of metal wires 220 required for plasma generation may be made different from components of the metal salt dissolved in the solution to synthesize an alloy catalyst.

Figure 9:
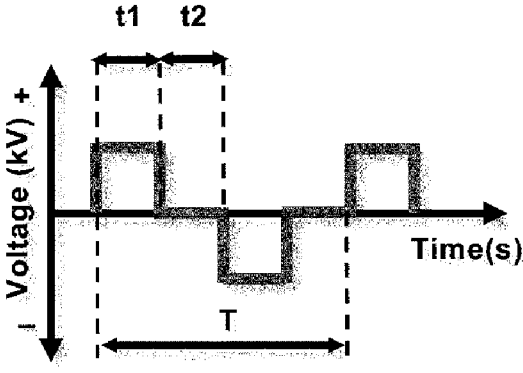
FIG. 9 is a graph showing an electrical signal according to a preferred embodiment of the present invention.

FIG. 9 is a graph showing an electrical signal according to a preferred embodiment of the present invention. Referring to FIG. 9, it can be seen that the bipolar pulsed direct electric power is applied in certain ranges of pulse width, frequency, and voltage in the second step.

In this case, the electric power 250 in the second step may be bipolar pulsed electric power by which an electrical signal is repeatedly applied with one or more pauses. In this case, the size of the catalyst becomes smaller with a decreasing temperature in the solution. This is because it is impossible to obtain a catalyst having a desired size when the electric power 250 is continuously applied to continuously increase the temperature in the solution.

When the pulse width is less than 0.5 μs, no reaction between the solution and the metal exuded from the metal wires may occur. On the other hand, when the pulse width is greater than 2 μs, the plasma discharge may be transitioned into arc discharge. Therefore, the pulse width is preferably in a range of 0.5 to 2 μs.

In particular, in the case of the arc discharge, as electric power is applied without any pauses, a large amount of current is generated to easily increase the temperature of the solution. That is, as plasma is heated to increase the temperature of the solution, a speed of growth in the solution is faster than a capping speed of the protecting agent, which makes it impossible to form nanosized particles.

In the case of the frequency, when the electric power developed for low frequency applications is less than 10 kHz, a plasma-off phenomenon occurs. On the other hand, when the electric power is greater than 30 kHz, the electric power may be transitioned into arc plasma. Therefore, the frequency is preferably in a range of 10 to 30 kHz. When electric power at which a SiC device is installed to enable high-frequency discharge is less than 80 kHz, a plasma-off phenomenon occurs. On the other hand, when the electric power is greater than 150 kHz, the electric power may be transitioned into arc plasma. Therefore, the frequency is preferably in a range of 80 to 150 kHz.

When the voltage is less than 1,000 V, plasma may be turned off due to the insufficient voltage during a plasma discharge process. On the other hand, when the voltage is greater than 1,700 V, the plasma may be transitioned into arc discharge, which makes it difficult to form a catalyst. Therefore, the plasma discharge is preferably caused in a voltage range of 1,000 to 1,700 V.

For reference, a separate nozzle does not need to be manufactured in order to atomize and spray a catalyst in the form of a nanoink obtained in the second step into the CNT synthesis unit 300, and a separate private jet atomizer for atomization may be used as an ultrasonic humidifier using an ultrasonic vibrator or as a painting air gun using an ejector effect. Therefore, various means may be applied to atomize and spray the nanoink for a catalyst.

Finally, the third step is a step of thermally treating a CNT growth material and a catalyst to dissolve the carbon precursor in the catalyst, thereby continuously synthesizing carbon nanotubes while growing the carbon nanotubes (S30).

Figure 10:
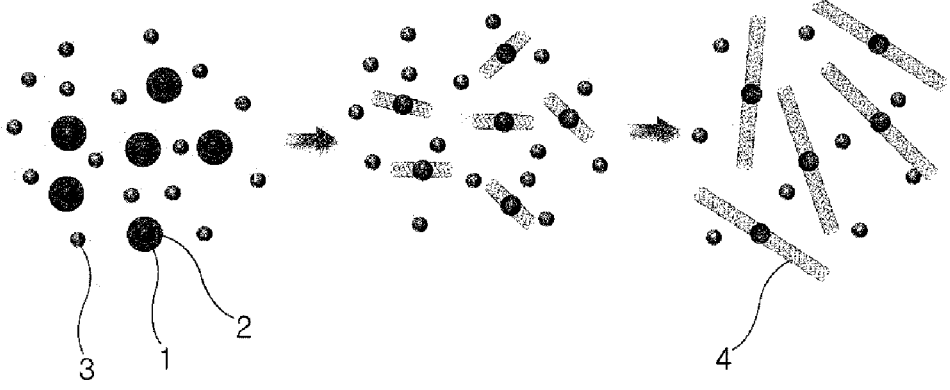
FIG. 10 is a diagram of synthesis of CNT according to a preferred embodiment of the present invention.

FIG. 10 is a diagram of synthesis of CNT according to a preferred embodiment of the present invention. Referring to FIG. 10, it can be seen that a process of synthesizing carbon nanotubes 4 in a furnace that is a CNT synthesis unit 300 is schematically shown.

First, the metal salt in the plasma zone is reduced into nanoparticles 1 such as iron (Fe), iron (Fe)-cobalt (Co), iron (Fe)-nickel (Ni), and the like due to the plasma generation in the chamber 210, and the reduced nanoparticles 1 is sprayed to flow in the furnace in a state in which the nanoparticles 1 are surrounded by ethanol 2 that is a surrounding solution.

Then, because the ethanol 2 primarily surrounds the peripheries of the nanoparticles 1 (it is just a case in which a solvent of the nanoink for a catalyst is ethanol), the carbon nanotubes 4 may first grow in the furnace. Then, as the ethylene 3 is charged into the furnace, subsidiarily charged ethylene 3 may further aid in growing the carbon nanotubes 4.

That is, the third step may be a process of synthesizing the carbon nanotubes through a reaction of the CNT growth material with the catalyst in the CNT synthesis unit 300, that is, a step of spraying the nanoink for a catalyst into the CNT synthesis unit 300 in the form of particles to allow ethanol surrounding the nanoparticles to grow carbon nanotubes, and dissolving a carbon precursor, which is included in the CNT growth material supplied from the carbon source supply unit 100 through the first flow path L1, in this catalyst to continuously grow the carbon nanotubes.

In this case, it is desirable that the temperature inside the CNT synthesis unit 300 is properly adjusted in a range of 500 to 1,200° C. In this case, when the temperature is less than 500° C., this temperature does not aid in continuously synthesizing the carbon nanotubes. On the other hand, when the temperature is greater than 1,200° C., physical properties of the carbon nanotubes to be synthesized may be degraded, or problems may be caused in terms of the purity of the carbon nanotubes. Therefore, the conditions of a temperature of 500 to 1,200° C. are preferably adjusted to perform thermal treatment.

Figures 11A, 11B:
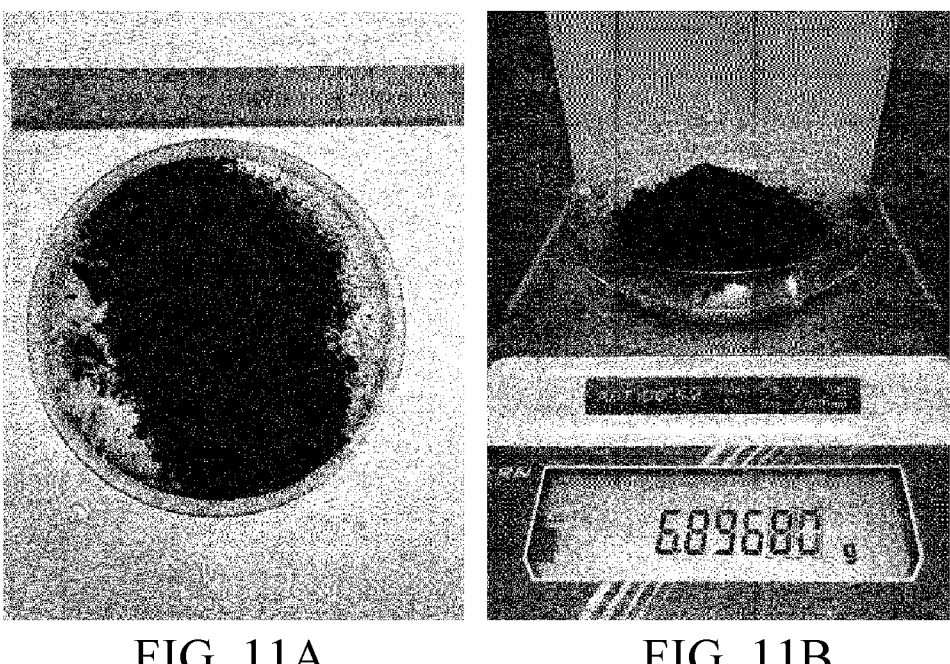
FIGS. 11A-11B show CNTs obtained according to the preferred embodiment of the present invention.

FIGS. 11A-11B show CNTs obtained according to the preferred embodiment of the present invention. FIG. 11A shows the obtained carbon nanotubes, and FIG. 11B shows that approximately 7 g of the carbon nanotubes may be actually obtained when the carbon nanotubes are synthesized for 20 minutes.

Figures 12A, 12B:
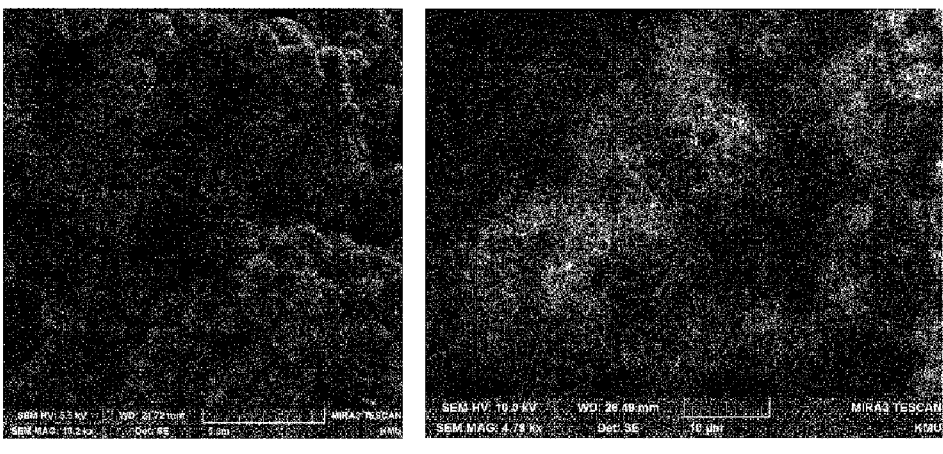
FIGS. 12A-12B are an SEM image according to a preferred embodiment of the present invention.

FIGS. 12A-12B is an SEM image according to a preferred embodiment of the present invention. FIG. 12A shows an SEM image of the carbon nanotubes after the carbon nanotubes are synthesized at the beginning of this experiment. Here, it can be seen that the purity of the carbon nanotubes is not so high because the carbon particles are observed. However, FIG. 12B shows an SEM image of the carbon nanotubes after the carbon nanotubes are synthesized in an advanced progress stage. Here, it is confirmed that the carbon particles are not observed, but only the carbon nanotubes exist.

Figure 13:
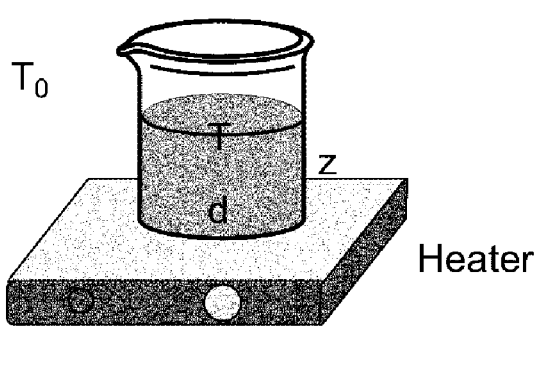
FIG. 13 is a flowchart showing a chemical reduction method in 300 mL of an aqueous solution.

FIG. 13 is a flowchart showing a chemical reduction method in 300 mL of an aqueous solution. Referring to FIG. 13, in order to calculate energy input when a conventional metal precursor, a reductant, and a protecting agent are used to synthesize a catalyst, a reductant, and a protecting agent are put into a beaker, stirred and heated. At this time, it can be seen that the energy consumption is tested.

Water Solution m=300 mL=300 g
Bicker Surface (z=75 mm, and d=75 mm)
A=0
$c=4.184 \text{ J g}^{-1}\text{K}^{-1}$
$h=100 \text{ Wm}^{-2}\text{K}^{-1}$ at glass-air interface
$\sigma=5.67 \ 10^{-8} \text{ Wm}^{-2}\text{K}^{-4}$
T=333 K
$T_0$=298 K
Convection Loss=77 W
Energy Lost by Convection=277 kJ $$\left(\frac{dQ}{dt}\right)_{conv} = hA(T - T_0)$$

Consumed Power=94.5 W
Energy=341 kJ

That is, when the metal precursor, the reductant, and the protecting agent are used to synthesize the catalyst, it is confirmed that 341 kJ of the energy is consumed. On the other hand, according to the present invention, it can be seen that 27 kJ of the energy is merely consumed during the synthesis of the catalyst, indicating that this energy value decreases to approximately $\frac{1}{10}$, compared to the energy as observed in the art. This may be confirmed according to the following procedure.

Energy per Pulse=0.5 mJ
Pulse Duration=1 us, Power per Pulse=500 W, f=15 kHz,
Time=1 h Average Power (from panel indications)=Approximately 150 V×2 A=300 W
Average Energy=1080 kJ
Plasma Energy=3,600×15,000×0.5×10–3 J=27 kJ Therefore, according to the present invention, because the energy consumption decreases to $\frac{1}{10}$ compared to when the conventional catalyst is synthesized, and the metal salt itself included in the solution is reduced during the synthesis of the catalyst, a separate reductant is not required, thereby not only reducing the manufacturing cost of the catalyst but also improving the purity of the catalyst. And, the metal salt and the metal wires can be combined to synthesize catalysts having various compositions. Also, because the catalyst can be synthesized at a high rate through plasma generation, the catalyst can be synthesized, and the carbon nanotubes can be continuously synthesized in real time at the same time.

The above description is merely illustrative of the technical spirit of the present invention, and those skilled in the art to which the present invention pertains may make various modifications and changes without departing from the essential characteristics of the present invention.

Therefore, the embodiments disclosed in the present invention are not intended to limit the technical idea of the present invention but to describe the present invention, and the scope of the technical idea of the present invention is not limited by these embodiments.

The scope of protection of the present invention should be interpreted by the disclosure herein, and all technical ideas within the scope equivalent thereto shall be construed as being encompassed in the scope of the present invention.

The invention claimed is:

1. A method for synthesis of carbon nanotubes (CNT), comprising:
   a first step of supplying a CNT growth material including a carbon precursor;
   a second step of disposing a pair of metal wires in a solution in which a metal salt is mixed, and applying electric power to the metal wires to generate plasma, thereby synthesizing a catalyst while reducing the metal salt into a metal atom; and
   a third step of thermally treating the CNT growth material and the catalyst to dissolve the carbon precursor in the catalyst, thereby continuously synthesizing carbon nanotubes while growing the carbon nanotubes,
   wherein the catalyst in the second step comprises an alloy catalyst including an alloy of two or more selected from cobalt (Co), nickel (Ni), and iron (Fe), and
   wherein the metal wires and the metal salt are composed of different metals to form the alloy catalyst through plasma generation, and the alloy included in the alloy catalyst is formed of the different metals composing the metal wires and the metal salt respectively.

2. The method of claim 1, wherein the CNT growth material in the first step comprises any one or more selected from the group consisting of a liquid-phase CNT growth material including ethanol ($C_2H_6O$), benzene ($C_6H_6$), and toluene ($C_7H_8$); a gas-phase CNT growth material including any one or more hydrocarbon compounds selected from methane ($CH_4$), propylene ($C_3H_6$), propyne ($C_3H_4$), propane ($C_3H_8$), butane ($C_4H_{10}$), butylene ($C_4H_8$), butadiene ($C_4H_6$), and ethylene ($C_2H_2$); and a solid-phase CNT growth material including Camphor ($C_{10}H_{16}O$).

3. The method of claim 1, wherein the electric power in the second step is bipolar pulsed direct electric power by which an electrical signal is repeatedly applied with one or more pauses.

4. The method of claim 1, wherein, in the second step, a protecting agent is mixed in the solution to cap the metal atom with the protecting agent.

5. The method of claim 1, wherein the catalyst in the second step further comprises any one or more selected from the group consisting of a metal catalyst including any one selected from cobalt (Co), nickel (Ni), and iron (Fe); and a metal oxide catalyst including cobalt oxide, nickel oxide, iron oxide, and a composite oxide of two or more thereof.

6. The method of claim 1, wherein the thermal treatment in the third step is performed under the condition of a temperature of 500 to 1,200° C.

*     *     *     *     *